United States Patent

[11] 3,629,817

| [72] | Inventor | William Frank Hill<br>Stafford, England |
| [21] | Appl. No. | 841,254 |
| [22] | Filed | July 14, 1969 |
| [45] | Patented | Dec. 21, 1971 |
| [73] | Assignee | Joseph Lucas (Industries) Limited<br>Birmingham, England |
| [32] | Priority | July 25, 1968 |
| [33] | | Great Britain |
| [31] | | 35,483/68 |

[54] WARNING SYSTEMS FOR ROAD VEHICLES
1 Claim, 1 Drawing Fig.
[52] U.S. Cl. .................................................. 340/62, 340/195, 340/263, 180/114
[51] Int. Cl. .......................................................... G08b 23/00
[50] Field of Search ............................................ 340/52, 52 R, 62, 195, 263; 200/42; 180/114, 106

[56] References Cited
UNITED STATES PATENTS

| 2,824,293 | 2/1958 | Meinhardt | 340/52 (E) UX |
| 2,994,073 | 7/1961 | Pelovitz | 340/52 (E) |
| 3,325,783 | 6/1967 | Webb | 340/52 (D) |
| 2,702,897 | 2/1955 | Dewey | 340/195 X |

*Primary Examiner*—John W. Caldwell
*Assistant Examiner*—William M. Wannisky
*Attorney*—Holman & Stern ABSTRACT: A warning system for a road vehicle has a pair of supply line across which is connected, a circuit including a first switch, a warning device and a second switch. The second switch is operated when a potentially hazardous situation exists in the vehicle, and the first switch is closed when the vehicle is in motion.

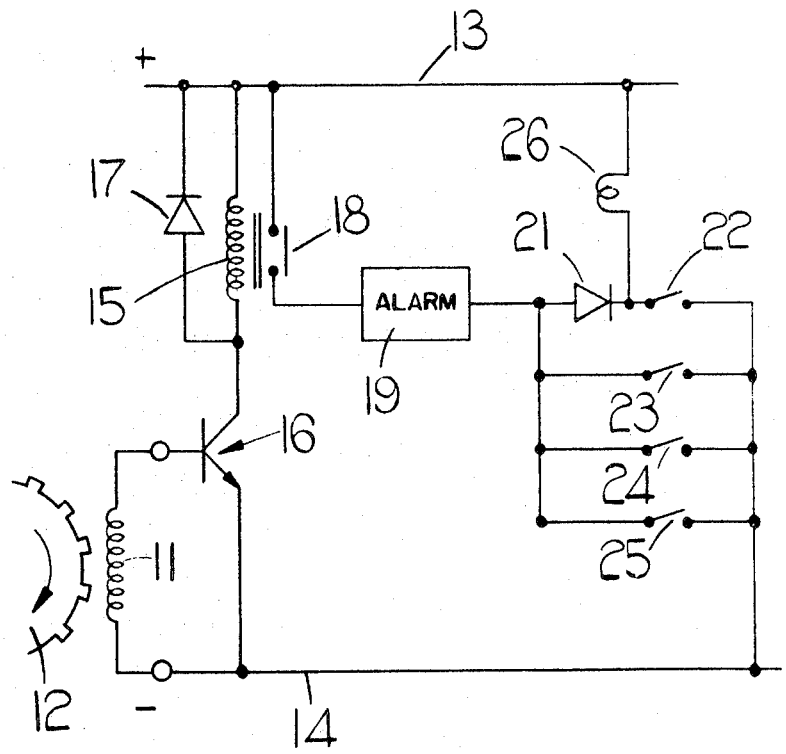

WARNING SYSTEMS FOR ROAD VEHICLES

This invention relates to warning systems for road vehicles.

It is usual for courtesy lights to be provided on a road vehicle, so that if a door of the vehicle is open the courtesy light will be illuminated. The illumination of the courtesy light will of course give a warning that the door is open, but particularly in daylight it cannot be seen by the driver, so that it is still possible to drive the vehicle with a door not properly fastened. It would of course be possible to provide a more substantial warning operated by the switches which in normal vehicles operate the courtesy light, but then the warning would be given when the vehicle is stationary, and would often be objectionable. The invention overcomes these problems by giving a warning signal which is readily audible or visible to the driver, but arranging that this signal is only given once the vehicle has started to move. The signal can be given if any door is open, or the boot is open, or seat belts are not fastened, or in a number of other potentially hazardous situations, it being understood that for each potentially hazardous situation a switch must be provided, or an existing switch utilized.

The accompanying drawing is a circuit diagram illustrating one example of the invention.

Referring to the drawing, an electromagnetic pickup winding 11 is located close to the teeth of the crown wheel 12 of the differential gear of a road vehicle so that when the road vehicle is in motion pulses are generated in the winding 11. The battery of the vehicle supplies power to positive and negative lines 13, 14, the line 13 being connected through the coil 15 of a relay to the collector of a transistor 16, the emitter of which is connected to the line 14 and the base of which is connected to the line 14 through the winding 11. The coil 15 is bridged by a diode 17, and when energized closes a contact 18 connected between the line 13 and one side of a warning device 19, which conveniently is a buzzer. The other side of the warning device 19 is connected to the line 14 through four parallel paths, the first of which contains a diode 21 and a switch 22, and the other three of which contain switches 23, 24 and 25. The function of the diode 21 and switch 22 is connected to the line 13 through a courtesy lamp 26.

The switch 22 is closed when a door, or a selected door, of the vehicle is opened, and the switches 23 and 24 are closed when the bonnet or boot are opened. A switch 25 is associated with at least the driver's seat belt, and is opened only when the driver's seat belt is fastened.

When the vehicle is not in motion, the contact 18 is opened and closing of the switches 22 to 25 has no effect on the warning device 19, although closing of the switch 22 still operates the courtesy lamp 26 in the usual way. When the vehicle is in motion, a sufficient number of pulses is generated in the winding 11 to hold the transistor 16 on, so that the relay is energized to close the contact 18. In these circumstances, closing of any of the switches 22 to 25 operates the warning device 19 to indicate the potentially hazardous situation to the driver. The diode 21 prevents operation of the lamp 26 upon closure of any of the switches 23, 24, or 25.

I claim:

1. A warning system for a road vehicle, comprising a pair of supply lines, a first circuit connected across said supply lines and including a normally open relay contact, a warning device, and a plurality of switches connected in parallel, means for closing various ones of said plurality of switches when a potentially hazardous situation exists in the vehicle, a second circuit connected across said supply lines and including a relay winding in the collector-emitter path of a transistor, a diode bridging said relay winding and connected so as to prevent current flow between the supply lines through the diode an electromagnetic pickup winding connected between the base and emitter of said transistor, and a tooth wheel driven by the engine and producing in said pickup winding pulses whereby said transistor is turned on when the engine speed reaches a predetermined value to energize said relay winding and close said relay contact, said warning device then being operative if any one of said plurality of switches is closed, a third circuit connected across said supply lines and including a courtesy lamp and a door switch, said door switch closing when a door of the vehicle opens and said courtesy lamp being illuminated upon closure of said door switch, and a diode connected between the juncture of said warning device and said plurality of parallel connected switches of said first circuit and the juncture of said courtesy lamp and said door switch in said third circuit, whereby only said door switch operates said courtesy lamp and further functions when closed to operate said warning device when the engine speed reaches said predetermined value.

* * * * *